INVENTORS.
Roy W. Shipman.
Harry E. Colestock.
BY John L. Stoughton
THEIR ATTORNEY.

FIG. 4.

INVENTORS.
Roy W. Shipman.
Harry E. Colestock.
BY
John L. Stoughton
THEIR ATTORNEY

United States Patent Office 2,874,334
Patented Feb. 17, 1959

2,874,334

POWER REGULATING APPARATUS

Roy W. Shipman, Detroit, and Harry E. Colestock, Commerce Township, Oakland County, Mich., assignors to Weltronic Company, Detroit, Mich., a corporation of Michigan Application July 16, 1953, Serial No. 368,479

24 Claims. (Cl. 315—230)

This invention relates generally to power regulating apparatus and is particularly adapted, among other uses, as a slope control for controlling the magnitude of power supplied to the welding electrodes of a resistance welding machine.

An object of this invention is to provide an improved apparatus for controlling the magnitude of power being supplied to a load.

Another object is to provide such an apparatus which is rapid in its operation.

Another object is to provide such an apparatus which performs its entire cycle of operation in response to a single initiating pulse.

Another object is to provide such an apparatus which, when once initiated, performs its controlling operation with electronic controlling elements and avoids the use of mechanical controlling apparatus.

Another object of this invention is to provide a power controlling apparatus which may be used with seam welding apparatus in which the interval between subsequent pulses may be of the order of a one-half cycle of 60 cycle energy.

A still further object of this invention is to provide a slope controlling apparatus which resets as a consequence of the application of an initiating pulse.

A still further object is to provide for the occurrence of such initiating pulse during a half cycle of the potential wave prior to the initiation of the flow of energy to the welding electrodes.

A still further object of this invention is to provide an improved electronic control for a phase shifting network.

Other objects of this invention will be apparent from the specification, the appended claims, and the drawings, in which Figure 1 schematically illustrates one form of the invention as applied to a seam welding control apparatus;

Figure 1:
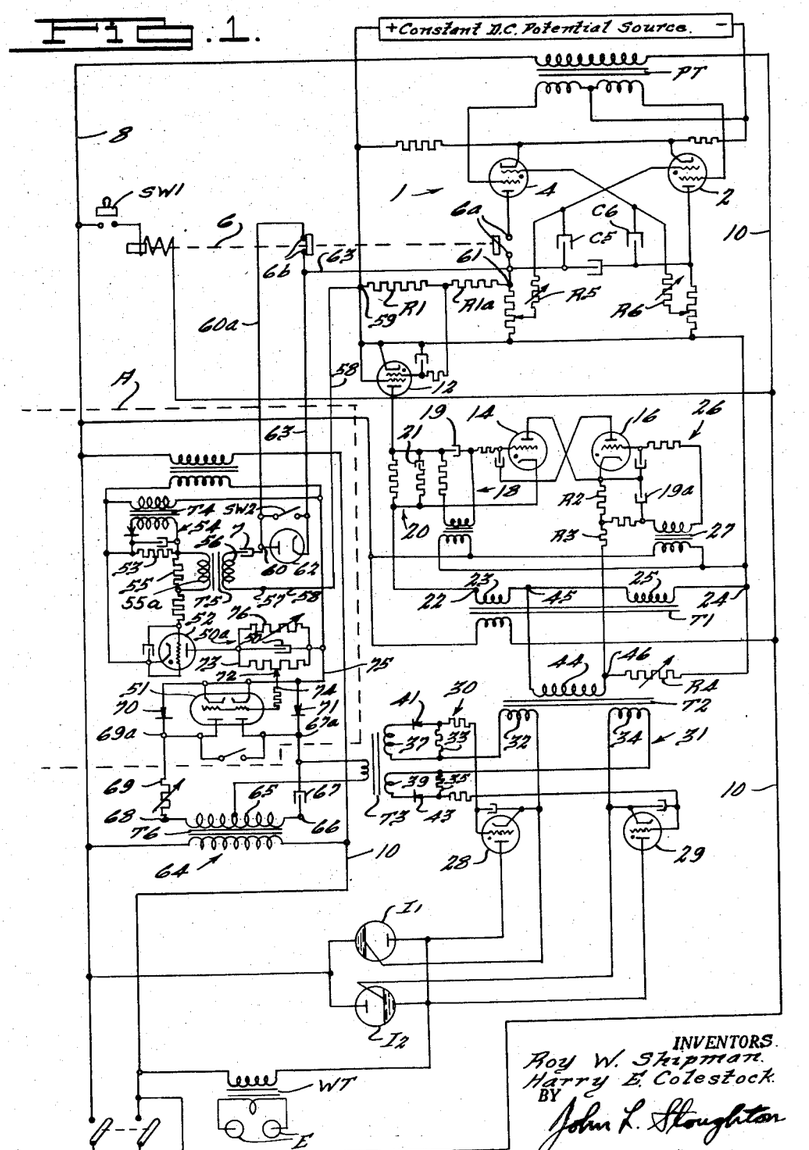

Referring to the drawings and more particularly Figure 1, there is shown an electrical network for controlling a resistance type seam welder in which the frequency of the energy pulses supplied to the welding electrodes E is controlled by a frequency controlling multivibrator 1. The multivibrator 1, as shown, comprises a normally conducting thyratron 2 and a normally nonconducting thyratron 4. The "current on" and "current off" times of the energy supplied to the welding transformer WT under control of the reversedly connected ignitrons I1 and I2 occur in response to the conductive periods of thyratrons 4 and 2 respectively.

Closure of a start switch SW1, which may be either a manually operated switch or a limit type switch, completes an energizing circuit for the relay 6 between a pair of alternating current supply conductors 8 and 10. Upon energization, the relay 6 opens its contacts 6b and closes its contacts 6a. Opening of the contacts 6b opens the discharge circuit for an impulsing capacitor 7 of a slope controlling network A for a purpose to be described below. Closure of the contacts 6a completes the anode-cathode circuit for the thyratron 4 across the "constant D. C. potential source." Thyratron 4 begins to conduct current at a point in the wave of the voltage supplied to the conductors 8 and 10 as determined by a peaking transformer PT. A normally conducting control thyratron has its anode-cathode circuit energized from a pair of conductors 8 and 10. The transformer PT is arranged to supply their pulse during the opposite half cycle to that in which control thyratron 12 can conduct and preferably at the 90° point in the wave.

When conducting, thyratron 4 energizes a pair of series connected resistors R1 and R1a thereby placing a blocking bias potential on the normally conducting control thyratron 12 maintaining it in a nonconducting condition whereby a pair of back-to-back leading and trailing thyratrons 14 and 16 controlled thereby are permitted to conduct. When conducting, thyratron 12 holds the thyratrons 14 and 16 blocked. The anode-cathode circuit of the thyratrons 14 and 16 are energized by the transformer T1 and the leading thyratron 14 is connected oppositely to the thyratron 12 whereby changes in control potential on the thyratron 14 occur during the half cycle in which cathode of the thyratron 14 is positive with respect to its anode.

The potential bias between the cathode and grid of thyratron 14 is the sum of the combined potentials of a clipping network 18 and of a blocking network 20. The clipping network 18 is energized from a suitable source of alternating potential which, as shown, is a transformer connected between the conductors 8 and 10 and includes a capacitor 19 and a resistor arranged to provide an alternating potential across the capacitor 19 which leads that supplied to the anode-cathode circuit of the thyratron 14 by an angle which may be in the neighborhood of 150 electrical degrees. When network 20 is de-energized and network 18 acts alone, it will bias the thyratron 14 into a conducting condition only during an initial portion of the alternating voltage wave applied between the anode and cathode of the thyratron 14 so that the thyratron, if it conducts at all, will conduct for substantially the complete half cycle.

The energization of the network 20 is controlled by thyratron 12 and when energized, due to conduction of the thyratron 12, provides a unidirectional blocking bias potential which supplies a negative (grid to cathode) component to the alternating potential supplied by the network 18. The magnitude of this potential is sufficient to prevent the network 18 from rendering the thyratron 14 conductive. When the thyratron 12 is held nonconducting in response to the conduction of the thyratron 4, this direct potential component disappears and network 18 renders thyratron 14 conducting early in the half cycle following the blocking of thyratron 12. Since the peaking transformer PT supplies its pulse at the 90° point in the voltage wave, thyratron 14 conducts in approximately three-quarters of a cycle after conduction of thyratron 4.

When conducting, thyratron 14 completes a circuit through the resistors R2 and R3 from the terminal 22 of the winding 23 of the transformer T1 to the terminal 24 of the winding 25 thereof through a variable resistor R4. The total resistance of the resistors R2, R3 and R4 is controlled by varying the magnitude of resistor R4 and is so adjusted that when the thyratrons 14 and 16 conduct the potential of terminals 45 and 46 are the same.

The magnitude of the resistor R2 is preferably greater than that of the resistor R3 and provides a potential thereacross which cooperates with a biasing network 26 associated with the thyratron 16 to cause the thyratron 16 to conduct every half cycle following the half cycles in which the thyratron 14 conducts. The network 26 includes a capacitor 19a in series with the secondary winding of a transformer 27 across the grid and cathode of the thyratron 16. The transformer 27 of the network 26 is 180° out of phase with the anode-cathode voltage of thyratron 16 and the capacitor 19a is charged by grid rectification during the half cycles in which thyratron 14 is held nonconducting to provide a negative grid to cathode bias during the half cycles in which the anode of thyratron 16 is positive with respect to its cathode. When, however, thyratron 14 conducts the voltage established across resistor R2 is of a larger magnitude and of a polarity opposite to that established by the transformer 27. The capacitor 19a, therefore, instead of being charged to maintain the thyratron 16 nonconducting is charged in the opposite polarity so that during the next half cycle (in which the anode of thyratron 16 is positive with respect to its cathode) the thyratron 16 will conduct in a trailing manner to the conduction of thyratron 14.

The firing of the ignitrons I1 and I2 is controlled by a pair of firing thyratrons 28 and 29, respectively, having their anode-cathode circuits connected intermediate the anode and ignitor of the respective ignitrons in the usual manner. The conductivity of the thyratrons 28 and 29, in turn, is controlled by a pair of biasing circuits 30 and 31, respectively. The circuit 30 includes one secondary winding 32 of a blocking transformer T2 and a resistor 33 connected in series therewith. Similarly, the circuit 31 includes a second winding 34 of transformer T2 and a resistor 35. The resistors 33 and 35 are energized with pulsating potential from the secondary windings 37 and 39 of a phasing transformer T3 through rectifiers 41 and 43 respectively. The rectifiers 41 and 43 are polarized to permit the energization of the respective resistors 33 and 35 in a direction to render the grids negative with respect to their cathodes and prevent any substantial energization of the resistors 33 and 35 in the opposite direction which might result in overcoming the negative or blocking bias provided by the transformer T2.

The primary winding 44 of transformer T2 is connected between the common terminal 45 of the windings 23 and 25 of transformer T1 and the common terminal 46 of the resistors R3 and R4. During nonconducting periods of the thyratrons 14 and 16 the winding 44 is in effect connected for energization by the winding 25 of transformer T1 and the secondary windings 32 and 34 are connected to provide a potential which is phased 180° with respect to the anode-cathode voltage of the respective thyratrons 28 and 29 to provide blocking bias potential between the respective grids and cathodes of these firing thyratrons and since the rectifiers 41 and 43 prevent any substantial energization of resistors 33 and 35 in a direction tending to render the firing thyratrons conductive, the thyratrons 28 and 29 will be held nonconducting whenever the transformer T2 is so energized.

Since, as stated above, the magnitudes of the resistors R2, R3 and R4 are so chosen that when the thyratrons 14 and 16 conduct, no potential will exist between the common terminals 45 and 46, the transformer T2 will be de-energized and thereby rendered ineffective to apply a blocking potential to the firing thyratrons 28 and 29 when thyratrons 14 and 16 conduct. Under this condition firing thyratrons 28 and 29 will conduct under control of the phasing transformer T3.

The phase of the potential applied to the transformer T3 is under control of the network A which will be described in detail below. For the present it is only necessary to observe that the phase of the voltage applied to the phasing transformer T3 may be varied to selectively adjust the point at which the potential supplied by winding 37 is such that energization of the resistor 33 is prevented by the rectifier 41. When the potential across the resistor 33 is reduced to a value which is less than the critical potential of the thyratron 28, the firing thyratron 28 fires and energizes the ignitor of the ignitron I1 to permit electrical energy to flow to the welding transformer WT. The winding 39 and rectifier 43 are arranged to energize the resistor 35 to provide a potential thereacross which is 180° out of phase with respect to the potential provided by the resistor 33 which cooperates with the firing thyratron 29 in the same manner to effect a similar control on the firing of ignitron I2. By changing the phase of the potential applied to the transformer T3, the firing thyratrons 28 and 29 and consequently the ignitrons I1 and I2 may be regulated to become conducting earlier or later in the wave of the voltage applied to their anode-cathode circuits for increasing or decreasing the magnitude of the power supplied to the electrodes E.

The period in which the ignitrons I1 and I2 are conducting is determined by the length of time that the thyratron 4 is conducting to maintain the thyratron 12 blocked. The overall length of time during which the electrodes E are periodically energized by the ignitrons is commonly referred to as the "heat" time and the intervening period is commonly referred to as the "cool" time. In the network shown, the conducting period of the thyratron 4 determines the "heat" time and the conducting period of thyratron 2 determines the "cool" time. The "heat" time or length of any one pulse is determined, in a major part, by the setting of the resistor R5 which controls the rate of discharge of the capacitor C5. When capacitor C5 is sufficiently discharged, the thyratron 2 will again conduct rendering thyratron 4 nonconducting to initiate the "cool" time. The length of "cool" time is determined, in a major part, by the setting of the cool time resistor R6 which controls the time rate of discharge of the capacitor C6. At the end of a predetermined "cool" time the thyratron 4 again becomes conducting to initiate a subsequent "heat" time. This continues for as long as the switch SW1 is maintained in closed position.

The network A controls the phase of the potential supplied to the transformer T3 with respect to the potential appearing between the conductors 8 and 10 in accordance with the charged condition of its capacitor 50 of a timing network 50a. More specifically, the charge on the capacitor 50 controls the bias potential applied to a dual triode type of vacuum discharge device or tube 51. Charging of the capacitor 50 is controlled by a thyratron 52 normally maintained in a nonconducting condition by a direct potential blocking bias supplied between its cathode and grid from a normally energized resistor 53. The resistor 53 is energized from a transformer T4 through a usual half wave rectifying and smoothing network 54. A second resistor 55, connected across the secondary winding 55a of a pulse supplying transformer T5, is connected in the grid biasing circuit of the thyratron and when energized provides a potential which is of opposite polarity to, and is superior to, that across the resistor 53 to render thyratron 52 conducting. One terminal 57 of primary winding 56 of the transformer T5 is connected by a conductor 58 to the positive terminal 59 of resistor R1. The other terminal of the winding 56 is connected through the direct current blocking capacitor 7 to a terminal 60. The terminal 60 is connected to the negative terminal 61 of the resistor R1a through a diode rectifier valve 62 and a conductor 63.

The phase shifting circuit 64 comprises a transformer T6 and has its primary winding connected between the supply conductors 8 and 10 and has a center tapped secondary winding 65. One of the outer end terminals 66 of the winding 65 is connected through an impedance element 67 (illustrated herein as being a capacitor but which could be an inductance, if desired) to a terminal 67a. The terminal 67a is connected to the anode of the right hand triode portion of the discharge device 51. The other outer end terminal 68 is connected through a variable resistor 69 to a terminal 69a which is connected to the anode of the left hand triode portion of the discharge device 51. The cathodes of the triode portions of the device 51 are connected together.

In order to permit current flow between the terminals 66 and 68 in a first direction through the right hand triode portion, a first rectifier 70 is provided in shunt with the left hand triode portion between the common cathode connection and terminal 69a and arranged to conduct current in a direction opposite to that through the left hand triode portion. Flow of current in the opposite direction between terminals 66 and 68 through the left hand triode portion is permitted by means of a second rectifier 71 connected in shunt with the right hand triode portion between the common cathode connection and terminal 67a and arranged to conduct current in a direction opposite to that through the right hand triode portion. A selected portion of the potential appearing across the capacitor 50, as determined by the position of the adjustable contact 72 of a potentiometer resistor 73 is applied between the common cathode connection and common grid connection of device 51 by means of conductors 75 and 74.

It is believed that the remainder of the constructional details of Figure 1 may best be understood by a description of the operation thereof which is as follows:

Upon closure of switch SW1 the relay 6 is energized through an obvious circuit to close its contacts 6a and open its contacts 6b. Opening of the contacts 6b opens a shunt circuit about the diode valve 62 through conductors 60a and 63 which, when closed, permits the blocking capacitor 7 to discharge. Closing of the contacts 6a completes the anode circuit for the thyratron 4 so that at the next subsequent time, (in the wave of the voltage supplied to the conductors 8 and 10) that the peaking transformer supplies a conducting bias potential between the shield grid and cathode of the thyratron 4, it will conduct to energize the resistors R1 and R1a, blow out thyratron 2, and permit the capacitor C5 to discharge at a rate determined, in a major part, by the resistor R5 to time the "heat" time.

The energization and de-energization of the resistors R1 and R1a serve to (1) block and unblock the thyratron 12, and (2) to control the energization of the transformer T5. Since the above initiate two series of operational effects which occur in timed relation to each other, a discussion of the effect of the blocking and unblocking of thyratron 12 will first be made and then the effect of the charging of the capacitor 7 and its subsequent effect on the firing valves 28 and 29 will be set out.

The anode-cathode circuits of the thyratrons 12, 14, 16, 28, 29 and 52 as well as the ignitrons are energized with an alternating potential; the thyratrons 12, 28, and 52 and ignitron I1 all have their anodes positive with respect to their cathodes during the same half cycle of the potential applied to the conductors 8 and 10 and for ease in describing this half cycle it will be considered as being the positive half cycle. The thyratrons 12, 16, and 29 and ignitron I2 all have their anodes positive with respect to their cathodes during the opposite half cycle which will be considered as the negative half cycle.

The thyratron 12 is arranged so that its anode is positive with respect to its cathode during the negative half cycle and since the thyratron 4 is rendered conducting during a positive half cycle the blocking bias is applied thereto during its nonconducting half cycle. Therefore when the subsequent negative half cycle occurs, the thyratron 12, being blocked, will not conduct and as a result the capacitor 21 thereof will not be recharged. The time rate of discharge of the capacitor 21 is such that unless it is recharged during the negative half cycle just prior to the positive half cycle in which thyratron 14 conducts, the capacitor 21 will discharge sufficiently so that the thyratron will conduct substantially at the beginning of the said next positive half cycle following the negative half cycle in which the thyratron 12 did not fire. The thyratron 16 trails the thyratron 14 and it conducts every negative half cycle following a positive half cycle which thyratron 14 conducts. Therefore as long as thyratron 12 is blocked, the thyratrons 14 and 16 will continue to conduct and as long as the thyratrons 14 and 16 conduct the transformer T2 will be de-energized to remove the blocking bias provided by windings 32 and 34. With the windings 32 and 34 de-energized, the thyratrons 28 and 29 will fire at some point as determined by the phase transformer T3 during each positive and negative half cycle to fire the ignitrons I1 and I2 whereby energy is supplied to the welding electrodes E.

At the end of the "heat" period the thyratron 2 will reconduct under control of the peaking transformer PT and put out thyratron 4 as well as initiate the discharge interval of the cool time capacitor C6 which thereupon discharges at a controlled rate through the adjustable resistor R6. Blocking of the thyratron 4 de-energizes the resistors R1 and R1a to a point sufficient to remove the blocking bias on thyratron 12. This occurs during a negative half cycle and thyratron 12 immediately conducts to recharge the network 20 to apply a blocking bias to thyratron 14. Since the thyratron 14 conducts in the positive half cycle, the thyratron fails to reconduct and at the end of the negative half cycle then in progress, the voltage is again re-established between terminals 45 and 46 and further conduction of firing thyratrons 28 and 29 and consequently ignitrons I1 and I2, is prevented.

Referring back to the second effect of energization of the transformer T5, the establishing of a potential across R1 and R1a causes a flow of charging current to the capacitor 7 through the primary winding 56 of transformer T5. This charging current of the capacitor 7 pulses the transformer T5 to establish an unblocking bias potential across resistor 55 to cause thyratron 52 to conduct. In this regard it is to be noted that potential supplied to the thyratron 52 is connected to establish a positive to negative potential anode to cathode during the positive half cycle. The charging of capacitor 7 occurs very rapidly and within a few degrees on the A. C. wave and the thyratron 52 conducts within a few electrical degrees following the unblocking of thyratron 4, to charge the capacitor 50. Since the capacitor 7 is completely charged in a very short interval, the potential pulse supplied to the resistor 55 quickly disappears and long before the next positive half cycle occurs the blocking bias of thyratron 52 will be reestablished.

A portion of the potential appearing across the capacitor 50 (as determined by the potentiometer or voltage divider 73) appears as a bias potential between the grids and cathodes of the discharge device 51. This potential is polarized to render the grids negative with respect to the cathodes to provide a relatively high anode to cathode resistance effect in device 51. This increased resistance effects an increased lagging of the phase of the voltage applied the transformer T3 with respect to the voltage applied to conductors 8 and 10. Transformer T3 therefore will maintain the negative blocking bias potential on the firing thyratrons 28 and 29 for a longer time in each half cycle in which they respectively conduct and the ignitrons I1 and I2 will be fired late in their conducting half cycles to provide for reduced power flow to the welding transformer WT and electrodes E.

After capacitor 50 has become charged and thyratron 52 reblocks, the charge of capacitor 50 will gradually be reduced due to the regulated current flow through the adjustable resistor 76. As the charge is reduced, the grid to cathode bias on the device 51 will decrease resulting in a decrease in the effective resistance of such device. This results in a decrease in the amount of lag in the voltage supplied to the transformer T3 and the firing thyratrons and ignitrons will fire progressively earlier, thereby increasing the power supplied to the electrodes E, until maximum power is being supplied as determined by the setting of the resistor 69. In normal operation this should occur in less time than the length of a heat pulse.

With the switch SW2 in open position, the capacitor 7 cannot discharge until reclosure of the contacts 6b of relay 6. This will not occur until switch SW1 is opened at the end of a seam welding operation. Consequently, with switch SW2 in open position, only a single "slope up" will occur at the start of each seaming operation. With switch SW2 in closed position, the capacitor 7 will discharge during each "cool" time and consequently capacitor 7 will charge during each "heat" time and a "slope up" will occur for each of the "heat" times.

Figure 2:
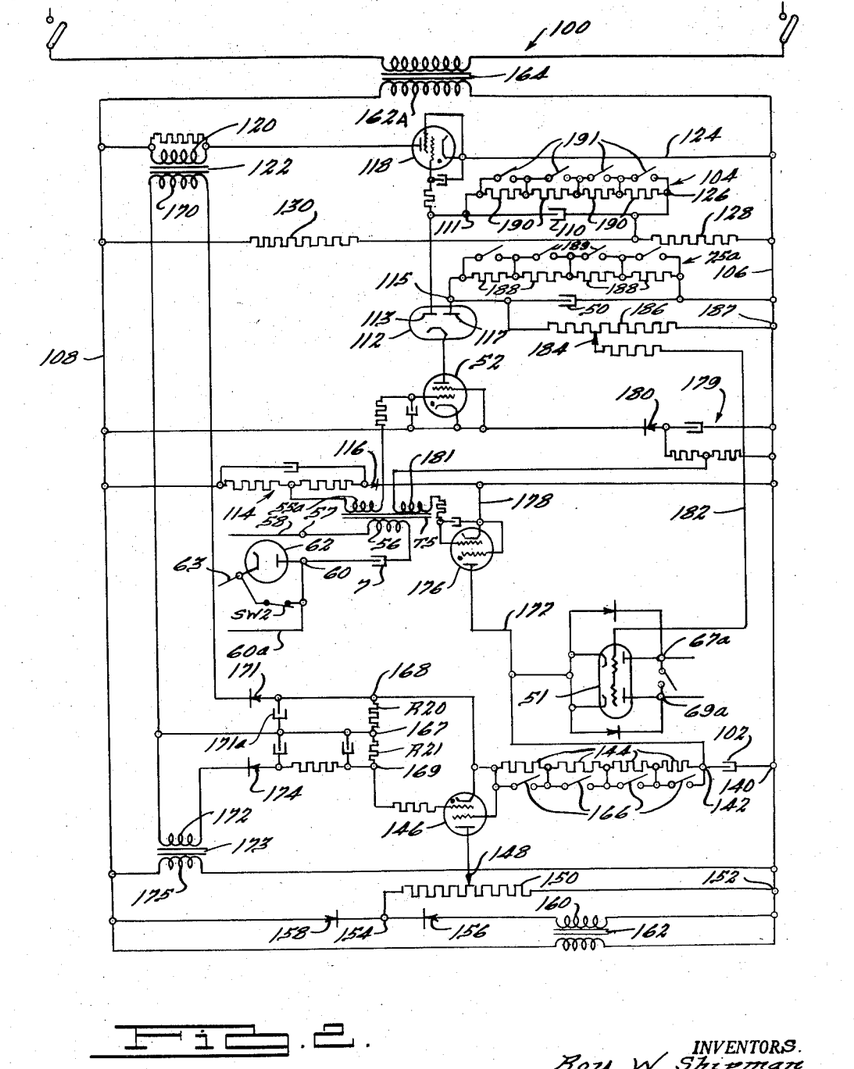
Figure 2 is a schematic view of a modified form of slope control for use in connection with the seam welding control shown in Figure 1.

The network 100 of Figure 2 not only includes the "slope up" capacitor 50 but also includes a "slope down" capacitor 102. These two capacitors cooperate together to control the bias potential applied to the discharge device 51. Only the discharge device portion 51 of the phase shifting network is shown in Figure 2, but it is to be understood that it cooperates with a phase shifting circuit such as is shown in Figure 1. A "slope down" interval timing network 104 is provided to control the initiation of charging of the "slope down" capacitor 102. The capacitor 50 is charged as a consequence of conduction of the thyratron 52 which completes a charging circuit between the alternating current busses 106 and 108. In order that the capacitor 110 of the network 104 may be charged concurrently with the charging of the capacitor 50 due to the conduction of the thyratron 52, a vacuum type dual anode discharge device 112 commonly called a diode rectifier valve, is provided, in series between each of the capacitors 50 and 110 and the anode of the thyratron 52. The negative terminal 111 of the network 104 is connected to the left-hand anode 113 of device 112 and the negative terminal 115 of the network 75a is connected to the right-hand anode 117. This discharge device 112 serves to isolate the charges on the two capacitors from each other so that they may independently perform their functions.

Thyratron 52 is normally held nonconducting by a negative bias potential placed between its grid and cathode from a bias voltage establishing network 114 connected between the conductors 106 and 108 through the rectifier 116. The voltage appearing across the capacitor 110 and consequently the network 104 is applied between the grid and cathode of a thyratron 118. The anode of thyratron 118 is connected through primary winding 120 of a control transformer 122 to the bus 108. The cathode of this thyratron 118 is connected by a conductor 124 to the bus 106. A small alternating current positive bias is superimposed upon the voltage established by the network 104 by the resistor 128. To accomplish this, the positive terminal 126 of network 104 is connected to a common point of a pair of series connected resistors 128 and 130 connected between the busses 106 and 108. The negative terminal 111 of the network 104 is connected through the usual current limiting resistor to the grid of the thyratron 118.

The negative terminal 140 of the capacitor 102 is connected to the bus 106 and the positive terminal 142 thereof is connected through a plurality of series connected resistors 144 to the cathode of a thyratron 146, the anode of which is connected to the adjustable contact 148 of a potentiometer 150. One end terminal 152 of this potentiometer is connected to the bus 106 and its other end terminal is connected to the common point 154 between a pair of opposed rectifiers 156 and 158. The free terminal of the rectifier 158 is connected to the bus 108 and the free terminal of the rectifier 156 is connected through the secondary winding 160 of a transformer 162 to the bus 106. The primary winding thereof is connected between the busses 106 and 108. The phasing of the winding 160 is in series additive relation with winding 162A of transformer 164, thereby effectively making the terminal 152 a center tap between the windings 160 and 162A with the rectifiers 156 and 158 connected to the outer terminals of this effective center tap winding. Since there is no reactance in this rectifier circuit, a pulsating potential at twice line frequency will appear between the terminals 152 and 154 to provide a pulsating unidirectional voltage for charging the capacitor 102 under control of thyratron 146. A plurality of shunting switches 166 are provided in shunt relationship with the resistors 144 and may be opened or closed to increase or decrease the charging rate of the capacitor 102 upon conduction of the thyratron 146.

The biasing circuit for the thyratron 146 includes a pair of series connected resistors R20 and R21 having a common terminal 167 and end terminals 168 and 169, the terminal 168 being connected to the cathode of the thyratron 146 and the terminal 169 being connected to the grid of this thyratron through the usual current limiting resistor. The secondary winding 170 of transformer 122 is connected through a rectifier 171 between the terminals 167 and 168 and the direction of current flow through the rectifier 171 is such that the terminal 168 of the resistor R20 is maintained negative with respect to the common terminal 167. A usual smoothing capacitor 171a may be connected in parallel with the resistor R20, if desired.

The secondary winding 172 of the transformer 173 is similarly connected to energize the resistor R21. The rectifier 174 in series therewith is arranged to conduct the current in a direction to maintain the terminal 169 of the resistor R21 negative with respect to the common terminal 167. The primary winding 175 of transformer 173 is continually energized from the busses 106 and 108 and continually energizes the resistor R21. During standby condition the thyratron 118 normally conducts energizing the transformer 122 to maintain the resistor R20 continually energized. The conducting potential established by the resistor R20 overrides the blocking bias potential established by the resistor R21 so that the thyratron 146 is normally maintained in a conducting condition to maintain the capacitor 102 charged.

The discharging of the capacitor 102 is under control of a thyratron 176, the anode of which is connected to the positive terminal 142 of capacitor 102 by means of a conductor 177. The cathode of the thyratron 176 is connected by means of conductor 178 and bus 106 to the negative terminal 140 of the capacitor 102. The thyratron 176 is normally biased into a nonconducting condition by means of a biasing network 179 energized from the busses 106 and 108 through a rectifier 180. This biasing circuit also includes a secondary winding 181 of the impulsing transformer T5 which has its secondary winding 55a connected in the biasing circuit of the thyratron 52. The primary winding 56 of this transformer T5 has the capacitor 7 in series therewith so that charging current of the capacitor 7 may be used to provide a voltage pulse in the transformer T5.

It is believed that the further details of construction of the network 100 may best be understood by a reference to the operation thereof, which is as follows:

Upon closure of the start switch SW1 and the subsequent energization of the resistors R1 and R1a (as described above in connection with the operation of Figure 1), a potential will appear between the terminals 57 and 60 which charges the capacitor 7 through the primary winding 56 of transformer T5. This results in a potential being impressed in its secondary windings 55a and 181. The potential induced in the winding 181 overcomes the negative blocking bias voltage supplied to the thyratron 176 from the network 179 to render this thyratron conducting to complete the discharge circuit for and to discharge the capacitor 102. The voltage induced in the winding 55a overcomes the negative blocking bias voltage provided by the network 114 to render the thyratron 52 conducting. As in the form of Figure 1, the thyratron 52 is arranged to conduct during the defined positive half cycle and will, therefore, immediately conduct and simultaneously charge the capacitors 50 and 110.

The charging of the capacitors 50 and 110 occurs very rapidly. Therefore, during the next or negative half cycle in which the bus 108 is positive with respect to the bus 106, the bias established by the network 104 will hold this thyratron from reconducting and the transformer 122 formerly supplied with half cycle potential will become de-energized. The potential then disappears from across the resistor R20 and the potential across the resistor R21 maintains a blocking bias potential between the grid and cathode of the thyratron 146 to prevent further charging of the capacitor 102. Since, as also discussed above in connection with Figure 1, the pulse supplied by the transformer T5 is momentary, the blocking bias on the thyratron provided by the network 114 will be reestablished prior to the next positive half cycle following the half cycle in which the capacitors 50 and 110 were charged. The conduction of thyratron 52 is merely for a portion of one positive half cycle and of a duration sufficient to completely charge these capacitors 50 and 110 and then blocks to prevent further charging.

The grids of the discharge device 51 are connected by means of conductor 182 to the movable contact 184 of a potentiometer or voltage dividing device 186 connected across the capacitor 50. The cathode of the discharge device 51 is connected to the conductor 177 and therethrough to the positive terminal 142 of the capacitor 102. The negative terminal 140 of the capacitor 102 is connected to the positive terminal 187 of the potentiometer 186 through the bus 106. It will therefore be apparent that the bias potential supplied to the discharge device 51 is the combined sum of the potential appearing across the capacitor 102 and that portion of the potential appearing across the capacitor 50 as determined by the setting of the movable contact 184.

The rate of discharge of the capacitor 102 through the thyratron 176 is very high and this capacitor 102 will be completely discharged prior to the rendering of the thyratron 14 conducting to remove the potential from the blocking transformer T2. Likewise the rate of charging of the capacitor 50 is sufficiently great so that it will be completely charged prior to the de-energization of the blocking transformer T2. Therefore, upon de-energization of the blocking transformer T2, the phasing of the voltage applied to the transformer T3 with respect to the voltage appearing across the primary conductors 8 and 10 will have been completed, and as explained above, the negative grid to cathode bias provided on the discharge device 51 will permit the firing thyratrons 28 and 29 to fire late in the positive and negative half cycles respectively to permit a reduced flow of power to the welding transformer WT and the welding electrodes E.

As described in connection with Figure 1, upon rendering of the thyratron 52 nonconducting the capacitor 50 commences to discharge through the discharge resistors 188 which, as shown in Figure 2, comprises a plurality of series connected resistors 188 and shunting switches 189. The capacitor 50 will discharge at a predetermined rate depending upon the number of shunting switches which are closed, thereby progressively decreasing the negative grid to cathode bias on the discharge device 51. This, as also described above, results in progressively increasing the power supplied to the welding transformer WT and electrodes E.

Concurrently with the discharging of capacitor 50 through the resistors 188, the capacitor 110 discharges through a plurality of series connected resistors 190 connected in shunt therewith. The number of resistors 190 which are effective is determined by the number of the resistor shunting switches 191 which have been closed. At a fixed predetermined time subsequent to the completing of the charging of capacitor 110, it will have again discharged sufficiently to permit thyratron 118 to reconduct. Reconduction of the thyratron 118 re-energizes transformer 122 to reestablish the conducting bias voltage on the thyratron 146 to initiate charging of the capacitor 102.

The rate of charging of the capacitor 102 is determined by the shunting switches 166 and the capacitor 102 charges at a fixed predetermined rate to progressively provide an increasing negative grid to cathode bias potential on the discharge device 51. This increasing negative grid to cathode bias progressively shifts back the point at which the firing thyratrons 28 and 29 are rendered conducting and progressively decreases the power supplied to the welding transformer WT and the welding electrodes E to provide "slope down" of power. The timing of the discharge of the capacitors 50 and 110 and the charging of the capacitor 102 to provide the desired increase and decrease in power supplied to the electrodes E is related with respect to the heat time, as determined by the conducting period of the thyratron 4, so that the capacitor 102 is charged to its predetermined value at the desired point in the heat pulse.

Upon reconduction of the thyratron 2 and the consequent initiation of a cool time and de-energization of the resistors R1 and R1a, the capacitor 7 will discharge through the resistors R1 and R1a to prepare itself for a subsequent operation as just described which occurs as a consequence of each energization of the thyratron 4 to establish a heat interval. With this arrangement, it will be observed that a "slope up" and a "slope down" will be accomplished for each heat pulse supplied to the welding electrodes E and that the network 100 returns to its standby condition at the end of each heat period. The resetting of the network 100 to discharge the capacitor 102 and charge the capacitor 50 is very rapid and takes place in a fraction of a cycle so that it is effective to provide a "slope up" and a "slope down" for each heat interval irrespective of the shortness of the duration of the cool time.

Figure 3:
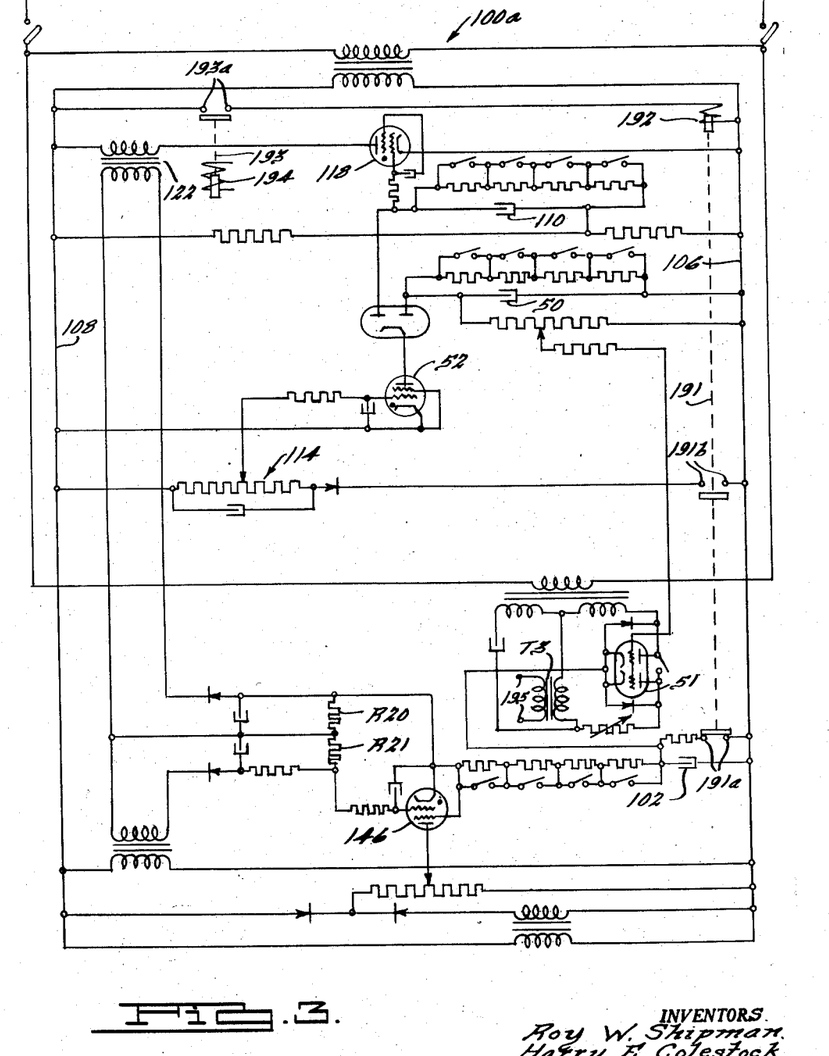
Figure 3 is a schematic view of a modified form of slope control for use with a spot welder; and, Figure 4 is a schematic view of a still further modified form of slope control for use with a spot welder.

In Figure 3 there is shown a modified form 100a of the slope control shown in Figure 2. In this form, the capacitor 102 is discharged as a consequence of the closing of the normally closed contacts 191a of the relay 191 and the thyratron 176 and its associated circuits are omitted. Also in this form, the thyratron 52, during standby conditions, is maintained in a conducting condition due to the normally open contacts 191b of the relay 191 which interrupts the energizing circuit for the blocking bias producing network 114. Since the thyratron 52 is normally conducting, the capacitors 50 and 110 will be normally charged to respectively maintain a rather high negative to cathode bias potential on the discharge device 51 and maintain the thyratron 118 normally blocked. Since the thyratron 118 is normally blocked, the transformer 122 located in its anode circuit will normally be de-energized to discharge the resistor R20 in the biasing circuit of the thyratron 146. With the resistor R20 de-energized, resistor R21 will normally maintain the thyratron 146 blocked to prevent any charging current from flowing to the capacitor 102.

The winding 192 of the relay 191 may be selectively energized in any desired manner and, as shown herein, is connected between the busses 106 and 108 through normally open contacts 193a of a control relay 193. The form of the invention shown in Figure 3, as will be apparent, combines many of the features found in the form shown in Figure 2 but is particularly adapted for use in connection with a single impulse spot welding apparatus, as for example, that shown in Elliott application, Serial No. 214,987, filed March 10, 1951, now Patent Number 2,656,461, and assigned to the same assignee as this invention.

In applying Figure 3 to the Elliott disclosure, the output terminals 195 of the phasing transformer T3 would be connected across the primary winding of the transformer T2 of the Elliott disclosure in place of the phase shift network 10, shown therein. Also, the energizing winding of 194 of the relay 193 would be connected for energization upon closure of the contacts CR2a of the relay CR2 of the Elliott disclosure. This relay CR2a is energized at the end of "squeeze" time and is maintained energized to the end of "hold" time. It is not necessary, however, to maintain the relay 194 energized except during "weld" time and, since the capacitor 50 is normally charged, the relay 194 may be connected in any other location in this circuit to provide for closure of the contacts 193a for the duration of the weld time interval. As, for example, the relay windings 194 might be connected between the Elliott terminals 58 and 60 which are normally energized and become deenergized during the weld time interval. In such event, the contacts 193a would be of the normally closed type so that they are closed only during the period in which there is no potential between the Elliott terminals 58 and 60.

Figure 4:
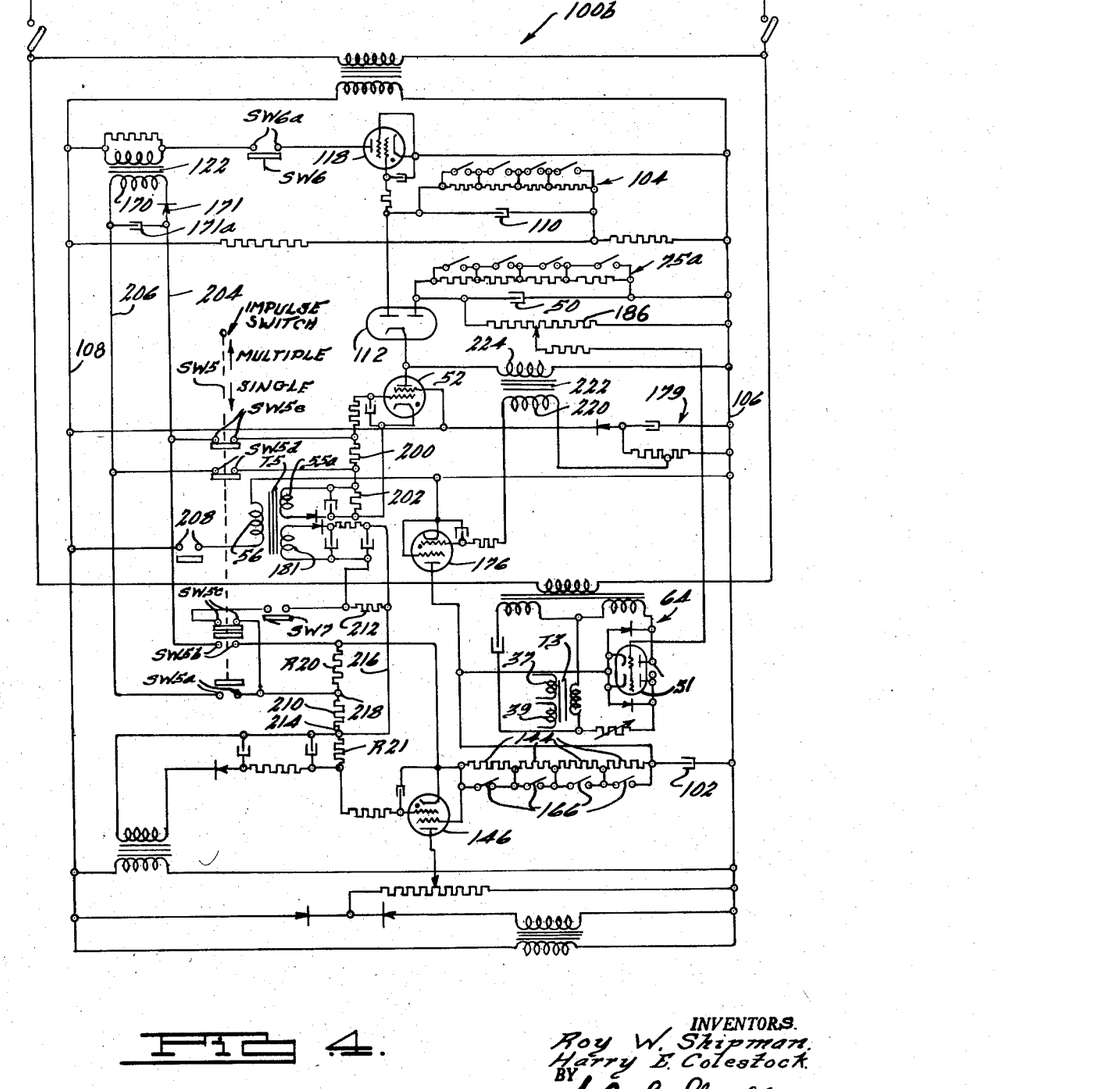

The network 100b, shown in Figure 4, is similar to the network 100 shown in Figure 2 but is particularly adapted for use with a pulsation type of spot welding apparatus, as for example, that shown in Undy Patent No. Re. 23,208, dated March 14, 1950, and provides for the "slope up" of the power at the initiation of a spot weld and for the "slope down" of the power either at a selected time as determined by a separate switch SW7 which may be closed at any desired time during the welding interval or at a predetermined time interval subsequent to the initiation of the energy flow to the welding electrodes depending upon the position of the selecting switch SW5.

The biasing circuit for thyratron 52 extends from its grid through a current limiting resistor and a pair of biasing resistors 200 and 202 to its cathode. The resistor 202 is connected to be energized from the winding 55a of transformer T5 through a half wave rectifying network. The resistor 200 is selectively connected to, and disconnected from, the direct potential conductors 204 and 206 by the contacts SW5e and SW5d of the switch SW5. During standby operation, the switch SW6 maintains its contacts SW6a open and de-energization of the transformer 122 and of the resistor 200 is thereby assured irrespective of the position of the switch SW5. The contacts SW6a may be operated by the Undy relay R1 of said Undy reissue patent whereby these contacts SW6a are closed at the beginning of "squeeze" time. The contacts 208 controlling the energization of the primary winding 56 of transformer T5 are normally open contacts and may be actuated by the relay R2 of the Undy reissue patent, which is energized to close these contacts 208 during the "heat" time interval. Since, during standby operation contacts SW6a and 208 are open, resistors 200 and 202 will be de-energized and thyratron 52 will be conducting and maintain the capacitors 50 and 110 charged. The charged condition of capacitor 50 maintains a negative bias potential on the vacuum discharge device 51 and the charged condition of the capacitor 110 of network 104 maintains a blocking bias potential on the thyratron 118 so that the subsequent closure of the contacts SW6a as a consequence of the initiation of a sequencing operation of the Undy network is without immediate effect and serves merely to place the energization of the transformer 122 under control of the network 104.

The biasing circuit for the thyratron 146 includes the resistors R20 and R21 and an additional biasing resistor 210 connected in series with and intermediate the resistors R20 and R21. The potential for energizing the resistor 210 is supplied from the winding 181 of transformer T5 through a switch SW7 which may be closed in any desired manner as, for example, by a suitable pulse counting circuit which closes the contacts after a desired number of energy pulses have been supplied to the welding electrodes. More specifically, the output of the winding 181 is fed through a half wave rectifying network to a resistor 212, one terminal of which is connected to the common point 214 of resistors R21 and 210 by conductor 216 and the other terminal of which is connected through the switch SW7 and contacts SW5c to the common point 218 of the resistors R20 and 210. Since the resistors R20 and 210 are de-energized during standby operation, the resistor R21 is effective to maintain the thyratron 146 nonconducting and the flow of energy to the capacitor 102 is prevented.

The capacitor 102 is maintained discharged during standby operation by means of the pulsating overriding bias potential which is superimposed upon the direct potential blocking bias supplied to the thyratron 176. The pulsating overriding bias is derived from the secondary winding 220 of a transformer 222 having its primary winding 224 connected between the anode of the thyratron 52 and the bus 106. Therefore, whenever the thyraton 52 is conducting, the transformer 222 will be energized and the thyratron 176 will be effective to maintain the capacitor 102 discharged.

The windings 37 and 39 of transformer T3 of the phase shifting circuit 64 may be connected to the control grids and cathodes of the Undy valves V7 and V8 and the circuit 64 hereof may be utilized in place of the phase shifting circuit of Undy.

When the contacts 208 are closed as a consequence of the energization of the relay R3 of Undy, the transformer T5 is energized to energize the resistor 202 and thyratron 52 becomes nonconductive to initiate the discharging of the capacitors 50 and 110 and to de-energize the transformer 222 whereby the thyratron 176 becomes blocked. As the capacitor 50 discharges, the potential of the transformer T3 advances with respect to that of the supply and increasing magnitude of power is supplied to the welding electrodes providing a "slope up" time. The time of discharging of the capacitor 50 may be less than, equal to, or greater than the length of the heat pulse as desired.

The time of discharge of the network 104 is less than the length of the first heat pulse so that it will have discharged sufficiently to fire the thyratron 118 prior to the opening of contacts 208. When the thyratron 118 fires (the contacts SW6a having been previously closed at the time the ram solenoid was energized to clamp the electrodes against the work), it energizes the transformer 122. With the switch SW5 in its up or shown position, the transformer 122 establishes a potential across the resistor 200 in a direction to maintain the thyratron 52 blocked irrespective of the opening of contacts 208 which occurs after the expiration of the "heat" time interval. Since the thyratron 118 can be blocked only as a consequence of charging the network 104, and the network 104 can only be charged by conduction of the valve 52, the conduction of valve 118 and the consequent energization of the resistor 200 effectively serves as a holding circuit for maintaining the thyratron 52 blocked until opened by an external operation which in this instance is the opening of the switch SW6 which occurs at the end of "hold" time.

With the switch SW5 in its up position, a "slope down" may be accomplished in any desired "heat time interval" in which the transformer T5 is energized by the closing of the switch SW7. This connects the bias potential developed across the resistor 212 across the resistor 210 to provide a voltage which overrides that of the resistor R21 to render the thyratron 146 conducting. Conduction of thyratron 146 permits the capacitor 102 to charge at a rate determined by the resistors 144 and switches 166. As the capacitor 102 charges, the phase of the voltage applied to the transformer T3 will be shifted back to reduce the magnitude of the power supplied to the welding electrodes. The switch 208 may be actuated in any desired manner as described above.

With the switch SW5 in its down position, the contacts SW5c, SW5d and SW5e are open and the contacts SW5a and SW5b are closed. Opening of the contacts SW5c prevents any voltage which may be established across the resistor 212 from being applied to the biasing circuit of the thyratron 146 and opening of the contacts SW5d and SW5e prevents the transformer 122 from energizing the resistor 200 to establish a locking circuit for maintaining the thyratron 52 nonconducting. Closure of contacts SW5a and SW5b connects the output conductors 204 and 206 of the transformer 122 across the resistor R20 whereby discharging of the network 104 and consequent conduction of the thyratron 118 will render the thyratron 146 conducting to charge the capacitor 102 in the manner described above in connection with the form of the invention shown in Figure 2 to provide a "slope down" operation. The network 100b when so operated is slower than the similar arrangement shown in Figure 2, and can only be used in instances where the "cool" times are sufficiently great to provide the necessary time to permit thyratron 52 to reconduct and recharge capacitor 50 during such "cool" time.

The network 100b is also adapted to control the operation of a controlling network for a seam welder, as for example, that shown in Figure 1. When so utilized, the contacts 208 and SW6a may be contacts of the relay 6 and the switch SW7 may be a limit or flag switch operated by the material being seam welded and actuated just prior to the completion of the welded seam. Likewise, the networks A and 100 may be used with spot welding controlling networks in which the potential supplied to the winding 56 of the transformer T5 is a direct potential which is established during some half cycle preceeding the initiation of the flow of welding current.

Although there is shown and described certain specific embodiments of the invention in accordance with the patent statutes, we are aware that many other modifications thereof are possible. The invention is therefore not to be restricted except as is necessitated by the prior art and the appended claims.

What is claimed and is desired to be secured by United States Letters Patent is as follows:

1. In an electrical timing apparatus, a plurality of sequentially operated timing networks, a first and a second of said networks each comprising an energy storage component and a discharge component for discharging said storage component, a first circuit controlling means for connecting and disconnecting said storage components to and from a source of electrical energy and normally maintained in a condition to disconnect said storage components from such source of energy, a third of said networks comprising an energy storage component and a component for controlling the rate of current flow thereto, a second circuit controlling means for connecting said storage component of said third network to a source of charging potential whereby it is placed in a charged condition, a discharge circuit for said storage component of said third network, means for placing said first circuit controlling means in its connecting condition to charge said storage components of said first and said second networks, means for rendering effective said discharge circuit of said third network to discharge said storage component of said third network, a phase shifting circuit including an output circuit and a control element for controlling the phase of the potential in said output circuit as a function of the magnitude of a potential supplied to said control element, circuit means connected across said storage components of said second network and said third networks and connected to said control element to provide a potential for actuating said control element, and circuit means controlled by the potential across said storage element of said first network for initiating said means which connects said storage component of said third network to such source of charging potential.

2. In an electrical apparatus for controlling the magnitude of phase shift of an output voltage relative to the input voltage of a phase shifting network, a first time responsive circuit for controlling an initial operation of said network, a second time responsive circuit for controlling a subsequent operation of said network, and a third time responsive circuit for determining the time of initiation of operation of said second circuit, each of said circuits including an energy storage component and means for supplying energy to charge said components and means for discharging said components, said second circuit being characterized by the fact that said energy storage component thereof is charged at a controlled rate, said first and third circuits being characterized by the fact that said energy storage components thereof are discharged at a controlled rate, initiating means for initiating the discharge of said storage components of said first and said third networks, means actuated as a consequence of the reduction of the magnitude of energy stored in said storage component of said third circuit for initiating a flow of energy to said storage component of said second circuit, and a bias circuit having a pair of output terminals connected to produce an output voltage which is proportional to the sum of the energy contained in said storage components of said first and said second circuits.

3. A fully electronic control for a phase shifting network and the like in which the degree of phase shift produced by such network is a function of the magnitude of a control potential applied to a pair of terminals thereof, a first electric valve having a pair of principal electrodes and a control electrode, a principal electrode circuit for said first valve and including a potential producing device controlled as a function of the conductivity between said principal electrodes, a first and a second timing network each said timing network including an energy storage component and a discharge component therefor, a first charging circuit means connecting said timing networks to a source of electrical potential and including electric valve means controlling the flow of energy from said source to said storage components, said valve means including at least two principal electrodes and at least one control electrode, a first bias circuit connected between two of said electrodes of said valve means, a third timing network including an energy storage component and a rate controlling component for regulating the rate at which energy can flow to said storage component of said third network, a second electric valve having a pair of principal electrodes and a control electrode, a second circuit including said principal electrodes of said second valve and said rate controlling component connecting said storage component of said third network to a source of electrical potential, a second bias circuit including said potential producing device of said principal electrode circuit of said first valve connected between said control electrode and one of said principal electrodes of said second valve means for controlling said first bias circuit to render said valve means conductive, a third bias circuit including at least a portion of said first timing network connected between two of said electrodes of said first valve, and a control potential circuit including at least a portion of each said second and third timing networks adapted to be connected to said terminals.

4. A fully electronic control for a phase shifting network and the like, a first electric valve having an anode and a cathode and a control electrode, an anode circuit for said first valve and including one winding of a first transformer, a first timing network having a first terminal connected to said control electrode and a second terminal connected to said cathode, said timing network including a first capacitor and a first resistor connected in parallel, a second timing network having a first and a second terminal and comprising a second capacitor and a second resistor connected in parallel, a second electric valve having a pair of anodes and at least one cathode, means connecting said first terminal of said first timing network to one of said pair of anodes of said second valve and said first terminal of said second timing network to the other of said pair of anodes of said second valve, a third electric valve having an anode and a cathode and a control electrode, means connecting said cathode of said second valve to said anode of said third valve, circuit means for connecting said second terminals of said timing networks to one side of a source of potential and connecting said cathode of said third valve to the other side of such source, a second transformer having a primary winding and a pair of secondary windings, circuit means including a source of unidirectional bias potential connecting one of said secondary windings of said second transformer between said control electrode and said cathode of said third valve, a fourth electric valve having an anode and a cathode and a control electrode, circuit means including a source of unidirectional bias potential connecting the other of said secondary windings of said second transformer between said control electrode and said cathode of said fourth valve, an anode circuit for said fourth valve including a capacitor, a charging circuit for said last-named capacitor and a cathode and an anode of a fifth electric valve and a resistor, said fifth valve having a control electrode, a bias circuit including a unidirectional potential bias and a secondary winding of said first transformer, said last-named bias circuit being connected between said control electrode and said cathode of said fifth valve, means including a direct current blocking capacitor for supplying a single energizing pulse to said primary winding of said second transformer, and a control circuit energized in accordance with the combined potentials appearing across said capacitor of said second circuit and said last-named capacitor.

5. The combination of claim 4 in which all of said sources of unidirectional potential are polarized in a direction to maintain the one of said valves with which they are associated in a nonconducting condition and in which the potentials developed in said secondary windings will overbias the potential established by the respective said unidirectional potential source as a consequence of the energization of the primary winding of the respective said transformer.

6. The combination of claim 4 in which said charging circuit for said last-named capacitor is energized from a source of unidirectional potential.

7. The combination of claim 4 including a heat supplying load circuit including at least one electric discharge device, said discharge device having a pair of electrodes the potential between which determines the instant at which said discharge device becomes conductive, a phase shifting network including an electric valve means the conductivity of which determines the degree of phase shift produced by said phase shifting network, said last-named valve means having a cathode means and a control means, and means connecting said control circuit between said cathode means and said control means of said last-named valve means.

8. The combination of claim 7 in which said phase shifting network includes a primarily reactive element, said last-named valve means includes a pair of anodes connected in series circuit with said element and in which a first rectifier is connected in shunt with one of said last-named anodes and said last-named cathode means and connected to conduct current in a direction from said last-named cathode means to said last-named one anode, and in which a second rectifier is connected in shunt with the other of said last-named anodes and said last-named cathode means and connected to conduct current in a direction from said last-named cathode means to said last-named other anode.

9. A phase shifting network including a transformer having a winding with a plurality of terminals, a circuit connecting two of said terminals including a reactive component, electric valve means having a pair of anodes connected in series in said circuit, said valve means having a common cathode means and a common grid means, a first rectifier connected to conduct current between one of said anodes and said cathode means and polarized to conduct current in a direction opposite to the direction of current flow through said valve means between said one anode and said cathode means, a second rectifier connected to conduct current between the other of said anodes and said cathode means and in a direction opposite to the direction of current flow through said valve means between said other anode and said cathode means, a biasing circuit connected between said cathode means and said grid means and including a pair of energy storage components, and control means individual to each of said storage components for individually controlling the energy stored therein.

10. The combination of claim 9 in which, said valve means is of the high vacuum type and in which a timing means is provided for timing the interval between the change in charge of one of said storage components and the change in charge of the other of said storage components.

11. A control apparatus for supplying a control potential to a power controlling apparatus which acts to control the magnitude of power supplied to a load as a function of a potential supplied thereto comprising, a pair of energy storage devices, an output circuit energized as a function of the combined potentials of said devices and having output terminals for connection with such power controlling apparatus, a first means connected with a first of said storage devices for regulating the rate of change in the energy stored in said first device from a first to a second magnitude and including an impedance element through which the current requisite to change the magnitude of the stored energy must flow, a second means connected with a second of said storage devices for regulating the rate of change in the energy stored in said second device from a first to a second magnitude and including an impedance element through which the current requisite to change the magnitude of this stored energy must flow, each said means including an electric valve having a pair of principal electrodes and a control electrode and connected to control the flow of current from a source of potential to its respective said storage device, a bias circuit for each of said valves, said bias circuits being individually connected between one of said principal electrodes and said control electrode of the respective said valve with which it is associated and normally maintaining a control potential to render its said respective valve in an initial state, an initiating network, means responsive to a change in state of said initiating network to actuate the one of said bias circuits associated with said valve of said first means whereby said valve of said first means in changed from its said initial to its said second state whereby the charge in said respective storage device is enabled to change from said second to said first magnitude, means for thereafter rendering said change in state of said initiating network ineffective to maintain said valve of said first means in its said second state whereby said just-mentioned valve is returned to its said initial state to permit a current flow through said impedance element associated with said first device whereby the magnitude of the stored energy in said first energy storage device is changed from its said second to its said first magnitude at a controlled rate, and circuit means including the other of said bias circuits actuated as a consequence of a change in state of said valve of said first means for rendering said valve of said second means effective to initiate a flow of current through said impedance element of said second means.

12. The combination of claim 11 in which there is provided a time delay means to delay the actuation of said valve of said second means subsequent to the actuation of said last-named circuit means.

13. A control circuit comprising, a first thyratron having an anode and a cathode and a control electrode, a biasing circuit connected between said control electrode and said cathode and including a first potential supplying means for impressing a first bias potential on said circuit tending to maintain said thyratron nonconducting, said circuit including a second potential supplying means independent of said first means for impressing a second bias potential on said network for overcoming said first potential to render said thyratron conducting, said second means including a transformer having a secondary winding connected into said circuit and having a primary winding, a pair of input terminals adapted to be supplied with unidirectional potential, a capacitor connected between one of said terminals and one portion of said primary winding, means connecting the other of said input terminals to a second portion of said winding, an anode-cathode circuit for said thyratron including said anode and said cathode and an energy storage component chargeable as a consequence of the conduction of said thyratron, a discharge component for said storage component, a vacuum discharge device having a main electrode and a control electrode, and means energized by said storage component and connected between said electrodes of said discharge device to control the bias potential therebetween as a function of the charged condition of said storage component.

14. In combination, a pair of reversedly connected ignitrons connected between a source of alternating potential and a load circuit, a multivibrator network including a pair of thyratrons and means for alternatingly rendering said thyratrons conducting, means for initiating the alternation of conduction of said thyratrons, said network including an impedance element connected to be energized as a consequence of the conduction of one of said thyratrons, a pair of firing thyratrons, said thyratrons being individually associated with said ignitrons whereby the rendering of one of said firing thyratrons conducting renders one of said ignitrons conducting and the rendering of the other of said firing thyratrons conducting renders the other of said ignitrons conducting, a pair of biasing networks, said biasing networks being individually connected to said firing thyratrons, a first bias potential source for said biasing networks and normally maintaining a bias potential in said biasing networks for maintaining said firing thyratrons nonconducting, means responsive to an energized condition of said impedance element for rendering said first source ineffective, a second source of bias potential for said biasing network and effective solely when said first source is ineffective to render said firing thyratrons conducting, a phase shifting network for controlling the phase of said second bias potential with respect to the phase of said source of alternating potential, said phase shifting network including a vacuum discharge device having a main electrode and a control electrode for controlling the magnitude of the phase shift as a function of the bias potential between said electrodes of said vacuum device, an impedance network including a storage component and a discharging component, circuit means connected between said electrodes of said vacuum device and energized from said impedance network for controlling the bias potential between said electrodes of said vacuum device, a control thyratron having a pair of main electrodes and a control electrode, a biasing circuit for said control thyratron connected between one of said main electrodes and said control electrode of said control thyratron, said biasing circuit including means for normally impressing a blocking potential for normally maintaining said control thyratron nonconducting, and an impulsing network connecting said impedance element with said last-named biasing circuit for momentarily impressng ia potential to overcome said blocking potential to render said control thyratron conductive, said impulsing network including means to limit said pulse to a fraction of a cycle of said alternating potential source.

15. In an electrical apparatus for individually supplying two pairs of terminals with bias potential, a thyratron having an anode and a cathode and a grid, a vacuum discharge device having a pair of anodes and a common cathode connection, a pair of input terminals adapted to be energized from a source of electrical potential, a pair of energy storage components, means connecting each of said components to one of said terminals, means connecting one of said components to one of said anodes of said device, means connecting the other of said components to the other of said anodes of said device, means connecting said common cathode connection to said anode of said thyratron, means connecting said cathode of said thyratron to the other of said input terminals, a first biasing circuit for said thyratron and connected between its said cathode and its said grid, a second bias circuit including at least a portion of one of said storage components, and connected between the terminals of one of said pairs of terminals, and a third bias circuit including at least a portion of the other of said storage components and connected between the terminals of the other of said pairs of terminals.

16. In an electrical apparatus for supplying a bias potential to a pair of terminals, a thyratron having an anode and a cathode and a grid, a vacuum discharge device having a pair of anodes and a common cathode connection, a pair of input terminals adapted to be energized from a source of electrical potential, a pair of energy storage components, means connecting each of said components to one of said terminals, means connecting one of said components to one of said anodes of said device, means connecting the other of said components to the other of said anodes of said device, means connecting said common cathode connection to said anode of said thyratron, means connecting said cathode of said thyratron to the other of said input terminals, a first biasing circuit connected between said cathode and said grid of said thyratron, a second bias circuit including at least a portion of one of said storage components, a second thyratron and a third thyratron each having an anode and a cathode and a grid, said second bias circuit being connected between said cathode and said grid of said second thyratron, an impedance device connected in series with said anode and said cathode of said second thyratron, and a fourth bias circuit connected across said last-named impedance device and between said cathode and said grid of said third thyratron, an energy storage device connected in series with said third thyratron, and a third bias circuit including at least a portion of the other of said pair of storage components and at least a portion of said storage device and connected between said pair of terminals.

17. In an electrical apparatus, a thyratron having an anode and a cathode and a grid, a vacuum discharge device having a pair of anodes and a common cathode connection, a pair of input terminals adapted to be energized from a source of electrical potential, a pair of energy storage components, means connecting each of said components to one of said terminals, means connecting one of said components to one of said anodes of said device, means connecting the other of said components to the other of said anodes of said device, means connecting said common cathode connection to said anode of said thyratron, means connecting said cathode of said thyratron to the other of said input terminals, a first biasing circuit connected between said cathode and said grid of said thyratron, a second bias circuit connected across one of said storage components, a second thyratron and a third thyratron each having an anode and a cathode and a grid, said second bias circuit being connected between said cathode and said grid of said second thyratron, an impedance device connected in series with said anode and said cathode of said second thyratron, a third bias circuit connected across said last-named impedance device and between said cathode and said grid of said third thyratron, a vacuum discharge device having a cathode and a grid, a third energy storage component connected in series with said anode and said cathode of said third thyratron, and a fourth bias circuit including at least a portion of said other storage component and at least a portion of said third storage component and connected between said grid and said cathode of said last-named vacuum device.

18. The combination of claim 17 in which said third bias circuit includes means for rendering said third thyratron nonconducting and in which said impedance device which is connected in series with said second thyratron acts upon energization to render said third thyratron conducting.

19. In an electrical apparatus for supplying a bias potential to a pair of terminals, a thyratron having an anode and a cathode and a grid, a vacuum discharge device having a pair of anodes and a common cathode connection, a pair of input terminals adapted to be energized from a source of electrical potential, a pair of energy storage components, means connecting each of said components to one of said terminals, means connecting one of said components to one of said anodes of said device, means connecting the other of said components to the other of said anodes of said device, means connecting said common cathode connection to said anode of said thyratron, means connecting said cathode of said thyratron to the other of said input terminals, a first biasing circuit connected between said cathode and said grid of said thyratron, a second bias circuit connected across one of said storage components, a third bias circuit including at least a portion of the other of said storage components and connected to said terminals, a second thyratron having an anode and a cathode and a grid, said second bias circuit being connected between said cathode and said grid of said second thyratron, an impedance device connected in series with said anode and said cathode of said second thyratron, and circuit means connecting said last-named impedance device to said first bias circuit.

20. In an electrical apparatus, a thyratron having an anode and a cathode and a grid, a vacuum discharge device having a pair of anodes and a common cathode connection, a pair of input terminals adapted to be energized from a source of electrical potential, a pair of energy storage components, means connecting each of said components to one of said terminals, means connecting one of said components to one of said anodes of said device, means connecting the other of said components to the other of said anodes of said device, means connecting said common cathode connection to said anode of said thyratron, means connecting said cathode of said thyratron to the other of said input terminals, a first biasing circuit connected between said cathode and said grid of said thyratron, a second bias circuit connected across one of said storage components, a second thyratron having an anode and a cathode and a grid, said second bias circuit being connected between said cathode and said grid of said second thyratron, an impedance device connected in series with said anode and said cathode of said second thyratron, circuit means connecting said last-named impedance device to said first bias circuit, a third thyratron having an anode and a cathode and a grid, an anode-cathode circuit for said third thyratron including a third energy storage device, a third bias circuit connected between said grid and said cathode of said third thyratron, a vacuum discharge device having a cathode and a grid, and a fourth bias circuit including said other storage component and said third storage component and connected between said grid and said cathode of said last-named vacuum device, and means for concurrently actuating said first and said third bias circuits.

21. In an electrical network, a pair of bias potential producing circuits, each said circuit including an energy storage component and a current controlling device for controlling the rate of change in the energy which is stored in said component, a vacuum discharge device having a cathode and a control element, and a bias circuit connected between said cathode and said control element and including in series connection a portion of each of said control circuits, each said portion being characterized by the fact that the potential thereacross is a function of the charged condition of the respective said storage component.

22. The combination of claim 21 in which said current controlling devices comprise electric discharge devices and in which there is provided a timing network responsive to a change in the conductivity of one of said last-named discharge devices for changing the conductivity of the other of said last-named discharge devices.

23. An electrical network comprising an energizable impedance device having end terminals and an intermediate terminal, said terminals being so arranged that upon energization from an alternating current source the potential between a first of said end terminals and said intermediate terminal is phase displaced 180° from the potential between the second of said end terminals and said intermediate terminal, a primarily reactive element, a pair of rectifiers, means connecting said reactive element and both of said rectifiers in series circuit between said end terminals, said rectifiers being connected in opposite sense in said series circuit whereby each opposes current flow in a different direction through said circuit, both said rectifiers being intermediate one terminal of said reactive element and one of said end terminals, an evacuated envelope, a pair of main electrodes and a control electrode located within said envelope, means connecting said main electrodes in shunt with one of said rectifiers, means providing a current path in shunt with the other of said rectifiers for current flow in a direction opposite to that through said other rectifier, and an output circuit connected between said intermediate terminal and a terminal intermediate said reactive element and said rectifiers.

24. An electrical network comprising an energizable impedance device having end terminals and an intermediate terminal, said terminals being so arranged that upon energization from an alternating current source the potential between a first of said end terminals and said intermediate terminal is phase displaced 180° from the potential between the second of said end terminals and said intermediate terminal, a primarily reactive element, a pair of rectifiers, means connecting said reactive element and both of said rectifiers in series circuit between said end terminals, said rectifiers being connected in opposite sense in said series circuit whereby each opposes current flow in a different direction through said circuit, both said rectifiers being intermediate one terminal of said reactive element and one of said end terminals, a shunting circuit for individually shunting each of said rectifiers, said shunting circuit including a vacuum valve having at least a pair of main electrodes and a control electrode and controlling the magnitude of current which flows in shunt circuit to at least one of said rectifiers as a function of a bias potential applied between one of said main electrodes and said control electrodes, a bias circuit for applying said bias potential, and an output circuit connected between said intermediate terminal and a terminal intermediate said reactive element and said rectifiers.

References Cited in the file of this patent

UNITED STATES PATENTS

| | | |
|---|---|---|
| 2,231,736 | Rose | Feb. 11, 1941 |
| 2,359,143 | Myers | Sept. 26, 1944 |
| 2,482,892 | Barwick | Sept. 27, 1949 |